United States Patent [19]

Wine et al.

[11] Patent Number: 5,253,041
[45] Date of Patent: Oct. 12, 1993

[54] DIGITAL TELEVISION SIGNAL COMPRESSION APPARATUS

[75] Inventors: Charles M. Wine, Princeton; Glenn A. Reitmeier, West Trenton; Kamil M. Uz, Plainsboro, all of N.J.

[73] Assignee: General Electric Company, Princeton, N.J.

[21] Appl. No.: 888,581

[22] Filed: May 26, 1992

[51] Int. Cl.$^5$ .................... H04N 11/04; H04N 11/20
[52] U.S. Cl. ....................................... 358/11; 358/13; 358/137
[58] Field of Search .................. 358/13, 11, 137, 138, 358/140

[56] References Cited

U.S. PATENT DOCUMENTS 5,122,875  6/1992  Raychaudhuri .................. 358/133
5,146,325  9/1992  Ng .................................... 358/135

OTHER PUBLICATIONS

International Organization for Standardization, ISO-IEC JTC1/SC2/WG11 "Coding of Moving Pictures and Associated Audio," ISO-IEC JTC1/SC2/WG11 MPEG 90/176 Rev. 2, Dec. 18, 1990.
Regis Saint Girons et al., "Proposal Package Description for MPEG Phase 2" Nov. 1991 (This is a communication to the International Organization for Standardization Moving Picture Experts Group).

Primary Examiner—Howard W. Britton
Attorney, Agent, or Firm—Joseph S. Tripoli; Eric P. Herrmann; Ronald H. Kurdyla

[57] ABSTRACT

A preprocessor for conditioning interlace-scan video signals for frame based compression, includes apparatus to accept fields of interlace-scanned video and provide fields of interlace-scanned luminance and chrominance component signals. The fields of interlace-scanned luminance component are combined into respective frames of luminance signal and applied to compressor apparatus for further processing. The fields of interlace scanned chrominance components are independently processed at the field level to generate lines of chrominance values which are interstitial to the lines of the original chrominance values and at a lesser pixel and line density. The independently processed fields of interlace-scanned chrominance signals are combined into respective frames of chrominance component signals and applied to compressor circuitry for further processing. Performing the chrominance signal interpolation and subsampling at the field level tends to eliminate a majority of color distortions around moving images. Receiver apparatus is configured to perform post decompression processing to generate frame data having the original pixel and line density.

12 Claims, 7 Drawing Sheets

ODD LINES
CHROMA VALUES
EVEN LINES

ONE BLOCK OF PIXELS
8-BY-8 MATRIX OF PIXELS FROM A CONTIGUOUS PORTION OF A VIDEO FRAME

PORTION OF A VIDEO FRAME

ODD LINES
EVEN LINES

DIGITAL TELEVISION SIGNAL COMPRESSION APPARATUS

This invention relates to apparatus for compressing an interlace scanned video signal into a non-interlaced compressed digital signal.

BACKGROUND OF THE INVENTION

The Moving Picture Experts Group (MPEG) are establishing a standard for transmission and storage of video data primarily for use by computers. This proposed standard is detailed in the document "International Organization for Standardization", ISO-IEC JT(1/SC2/WG1), Coding of Moving Pictures and Associated Audio, MPEG 90/176 Rev. 2, Dec. 18, 1990. The signal protocol includes the processing of successive frames of interlace scanned video signal according to a sequence of inter- and intraframe compression techniques. However only the odd fields of respective frames are processed and transmitted. The Advanced Television Research Consortium (ATRC) has adapted this protocol for the transmission of higher resolution video images wherein both even and odd frames are processed and transmitted.

According to the compression protocol, the video signal is processed over respective image areas of, for example, 16-by-16 pixels. Such areas are represented by respective macroblocks of data. Each macroblock includes six blocks of data. Four of these blocks correspond to luminance information, with each block representing an 8-by-8 matrix of pixels. The remaining two blocks correspond to chrominance information, i.e., one block of U and one block of V color difference information (U and V may represent the conventional B-Y and R-Y signals). These blocks respectively represent the color information over the entire macroblock, but in subsampled form. That is, the 16-by-16 block of pixels representing chrominance is interpolated down to an 8-by-8 block of values, and the interpolated values are encoded.

Encoding is performed on a frame basis. Successive pairs of interlace-scanned even and odd fields are first combined into frames of data, and thereafter the frames of data are processed as a unit. Refer to FIG. 1 which illustrates a block of pixel values. The small squares represent samples corresponding to respective pixels. The shaded squares represent lines of pixels from an odd field and the white squares represent lines of pixels from an even field. The compressed luminance data is derived from a matrix of image sample values arranged similarly to the illustrated matrix of squares. The circles represent interpolated chrominance samples, either U or V. Nominally each chrominance value is calculated from corresponding neighboring pixel values as indicated for example, between the upper two rows of the figure. The resulting matrix of chrominance values represents an image which is subsampled by a factor of two in both vertical and horizontal directions.

FIG. 2 illustrates, in part, the problem of processing the data on a frame basis when the frames of information are derived from interlace-scanned images. In interlace-scanned images both the odd and even fields are intended to represent constituent parts of a single image at a single instant in time. However odd and even fields are scanned consecutively, therefore they cannot represent the same image at the same instant. In fact there will be relative motion between even and odd fields of image objects in the same frame. In FIG. 2, assume that a red box, RO, occurs in the odd field as illustrated, and moves to the location occupied by the box RE in the even field. The raw pixel values representing the red box are shown in black in both the even and odd fields. Regarding interpolation of the chrominance values it may be seen that the only interpolated chrominance values associated with the red box that will represent the proper color are those included in both of the boxes RE and RO. All other interpolated chrominance values associated with the red box will represent a combination of colors. The color distortion is exacerbated by the fact that the raw video signal applied to the compressor will nominally have been gamma corrected, resulting in nonlinearities in the interpolated values which are amplified by the inverse gamma function at the display device.

When viewing the output of a MPEG compressor/decompresser, the worst artifact is not an MPEG problem, but rather a preprocessing result. Large colored moving objects develop highly visible luminance and chrominance leading and trailing edge distortions. The distortions are objectionable and clearly visible at normal viewing distance. The observed effect is that of wrong color in areas of intraframe object motion (i.e. motion between fields). The color is not only incorrect in hue, but also in saturation and luminance.

From the illustration of FIG. 2 it may appear that the distortion is confined to small areas, but it is not. Between fields an object may move a significant number of lines and pixels, and the effect will be manifested over the lines and pixels that the object moved, and will be readily apparent even to the noncritical observer.

SUMMARY OF THE INVENTION

The present invention is a preprocessor incorporated in signal compression apparatus for ameliorating the affects of image motion on subsampled/interpolated chrominance values derived from frames of video signal composed of interlace scanned fields of video signal. The preprocessor includes apparatus to accept fields of interlace-scanned video and provide fields of interlace-scanned luminance and chrominance component signals. The fields of interlace-scanned luminance component are combined into respective frames of luminance signal and applied to compressor apparatus for further processing. The fields of interlace scanned chrominance components are independently processed at the field level to generate lines of chrominance values which are interstitial to the lines of the original chrominance values and at a lesser pixel density. The independently processed fields of interlace-scanned chrominance signals are combined into respective frames of chrominance component signals and applied to compressor circuitry for further processing. Performing the chrominance signal interpolation and subsampling at the field level tends to eliminate a majority of color distortions around moving images.

In receiver apparatus for processing signal processed according to the foregoing preprocessing, the compressed signal is first decompressed to frames of baseband luminance and chrominance components. The frames of baseband luminance and chrominance components are then separated into respective odd and even fields. The even(odd) fields of luminance are matrixed with the even (odd) fields of chrominance to produce fields of R, G and B color signals for display.

DETAILED DESCRIPTION

Figure 7:
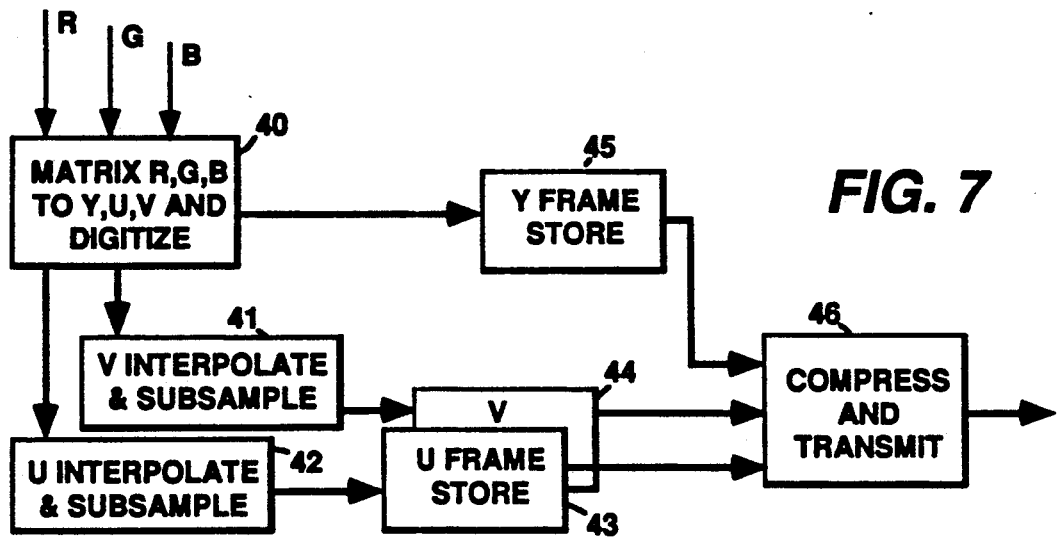
FIG. 7 is a block diagram of a portion of a video signal compression system according to the invention.

Refer to FIG. 7 which illustrates preprocessing circuitry for a video signal compression apparatus. In the figure, interlace scan R, G, and B color signals from for example a video camera, are applied to matrix circuitry 40 which generates luminance, Y, and color difference signal components U and V. The output of circuitry 40 is presumed to be in sampled data digital form. The interlace-scan luminance component is applied to a frame memory 45 wherein successive odd and even fields of luminance signal are combined into corresponding frames of luminance data. The frames of luminance data are successively applied to a video signal compressor 46 for compression and transmission. The compressor 46 may be of the type described in U.S. Pat. No. 5,122,875, which processes video data according to an MPEG-like protocol. As such the luminance component is processed substantially independently of the chrominance information (except for the affect the volume of compressed chrominance data has upon quantization of the compressed data).

The U and V chrominance components are preprocessed independently, but similarly, by elements 42, 43 and 41, 44 respectively. Considering the U component, successive fields of U chrominance component data are applied to element 42, wherein it is interpolated and subsampled in both the vertical and horizontal dimensions. Successive fields of interpolated and subsampled U data from element 42 are applied to a storage element 43. In storage element 43, successive odd and even fields of data from element 42 are combined into corresponding frames of U data, which is thereafter applied frame by frame to the element 46 for compression and transmission.

Figure 1:
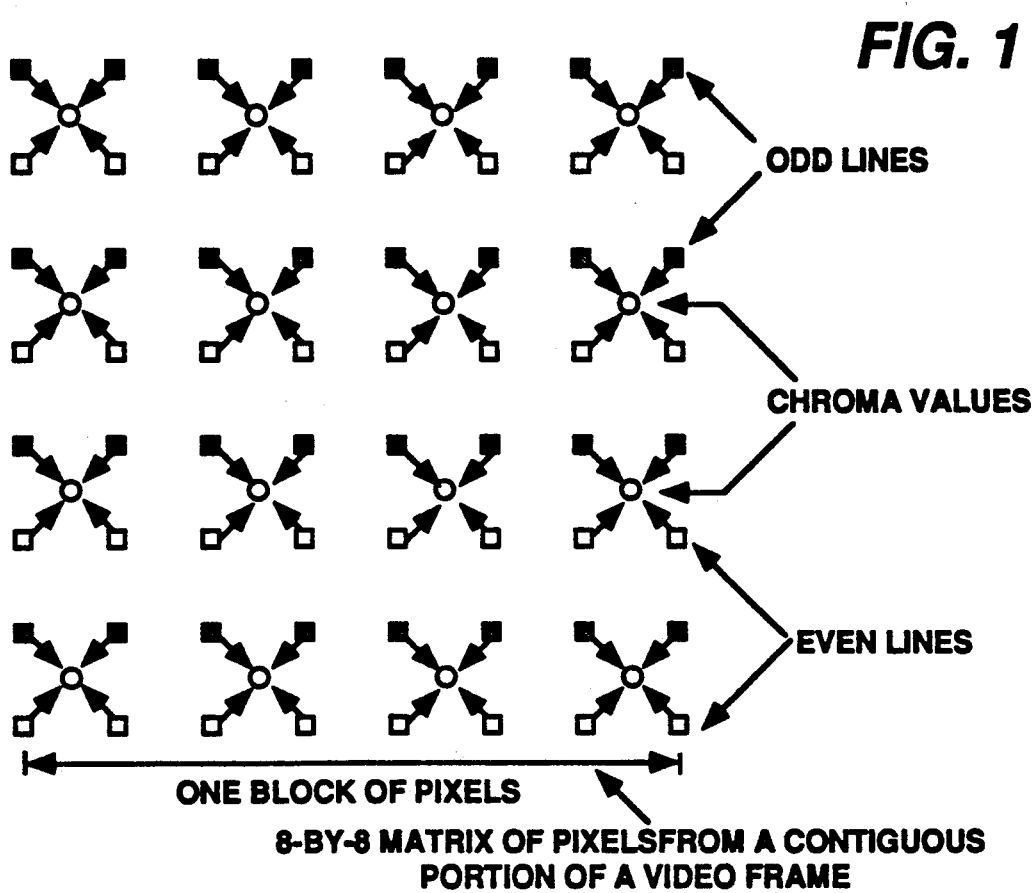
FIGS. 1 and 2 are pictorial drawings of blocks of pixel values useful in the understanding of the invention.
Figure 2:
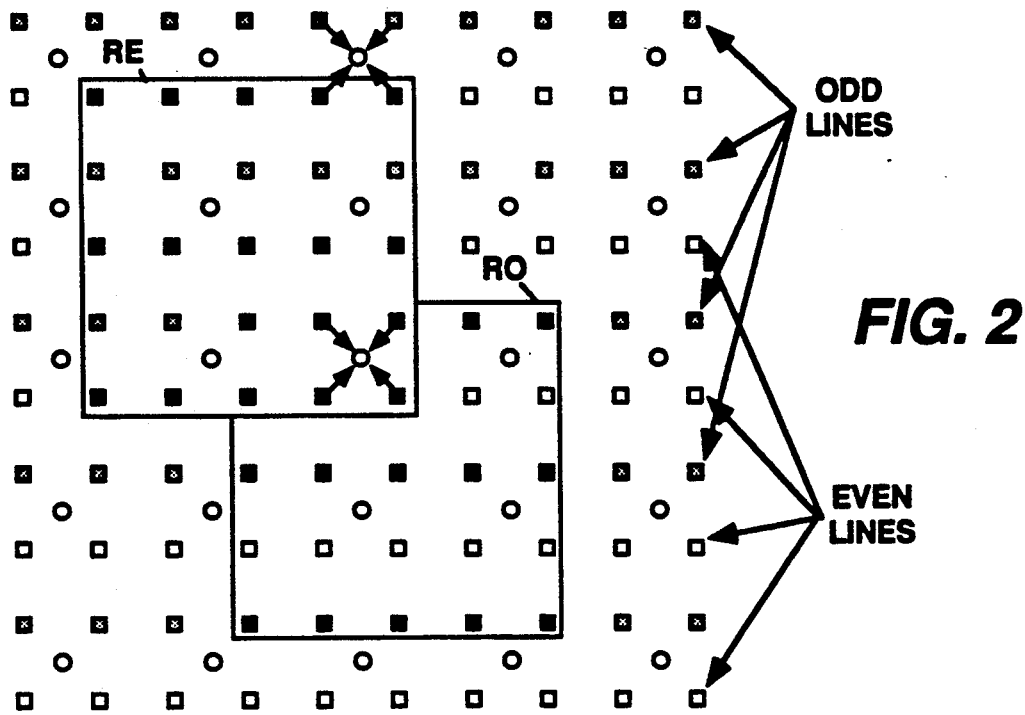
Figure 3:
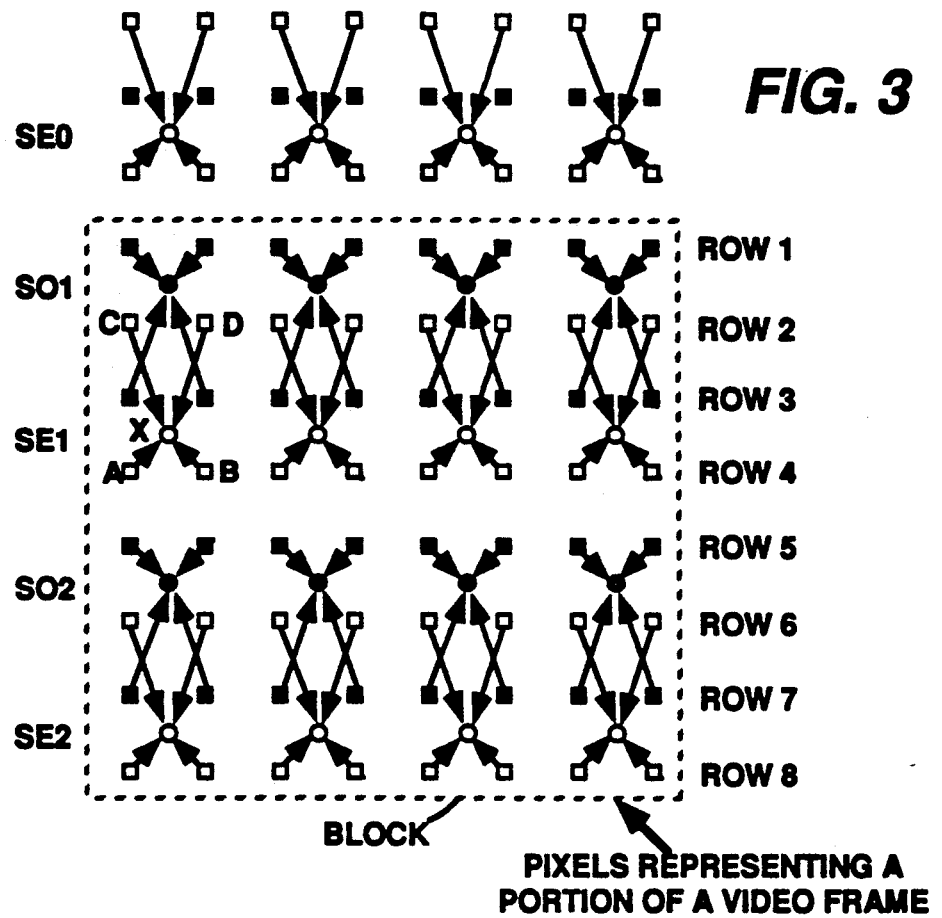
FIGS. 3 and 4 are pictorial representations illustrating alternative methods of generating subsampled chrominance values, prior to compression, according to the present invention.

Refer to FIG. 3 which shows a matrix of squares of 8 rows by 8 columns representing, for example, raw U chrominance component pixel data. The 4-by-4 matrix of circles represent subsampled U chrominance component data. Odd and even numbered rows correspond to data from odd and even fields respectively. The arrows directed from the squares of raw data to respective circles indicate the pixels of raw data which contribute to the formation of the resultant subsampled chrominance data. It is seen that the resultant subsampled data values are formed exclusively of odd field data or exclusively of even field data. Nominally subsampling is performed before the field data is combined into frames of data. The raw data is presented in combined fashion to illustrate the spatial location of the subsampled data relative to the raw data. The rows of subsampled data are located in the matrix according to the MPEG protocol. Note that the rows of subsampled data are not equidistant from the rows of raw data contributing to the formation of the rows of subsampled data. If e.g., the MPEG protocol relating to chrominance component positioning with respect to the raw data is to be preserved, it should be immediately obvious that the two rows of raw data contributing to the formation of a row of subsampled data, do not contribute in equal proportion. Consider the subsampled value X, which is formed from contributions of raw pixels A, B, C and D. Pixels A and B lying closer to X than pixels C and D provide a greater contribution according to the equation:

$$X = (3[A+B] + [C+D])/8. \quad (1)$$

The row (e.g., SE1) of subsampled data is formed from pixel data from rows 2 and 4. However at a receiver corresponding rows 2 and 4 cannot be reconstructed from the transmitted row of subsampled data SE1 without loss of detail. If some loss of detail is acceptable, then the received subsampled data may be upconverted by interpolating in the horizontal dimension to generate lines having a horizontal pixel density equal to the original horizontal pixel density. These interpolated lines may be repeated as substitutes for the respective lines from which corresponding lines of subsampled data were derived. Alternatively, lines of recovered information may be reconstructed with apparent greater vertical detail by performing interpolation of the recovered samples in both the vertical and horizontal dimensions.

Assume that the rows of data SEi were formed according to the relationship indicated by equation 1. An exemplary algorithm for vertically upconverting such data by interpolation may take the form;

$$R4i = \tfrac{3}{4}(SE1i) - \tfrac{1}{4}(SE2i) \quad (2)$$

$$R6i = \tfrac{1}{4}(SE1i) - \tfrac{3}{4}(SE2i) \quad (3)$$

where R4i and R6i are the ith sample points generated for rows 4 and 6 respectively, and SE1i and SE2i are the ith samples in the rows SE1 and SE2 of the recovered data.

Figure 4:
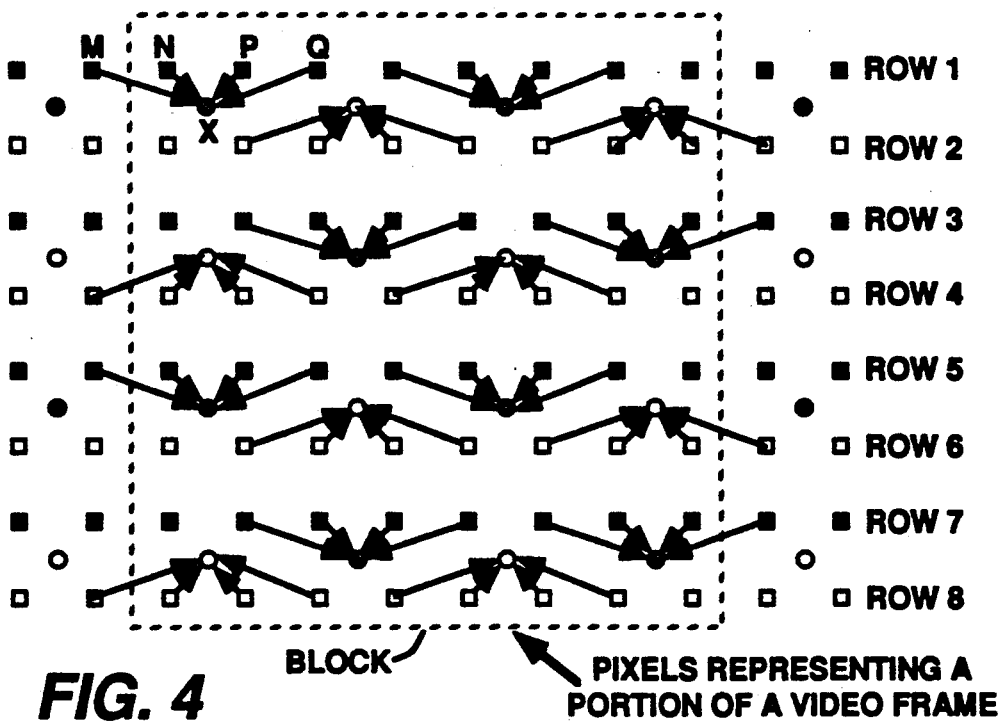

FIG. 4 shows in pictorial form an alternative method for generating subsampled chrominance values of a field by field basis. In this example, rows of subsampled odd (even) field data are derived from single rows of odd (even) field raw data. It should be noted that this technique does not lend itself to developing subsampled data points having the spatial positions set forth in the MPEG standard, and horizontal resolution is sacrificed for vertical resolution in reproduced images. However every row of reconstructed data is reconstructed from exclusively different transmitted data. The four raw pixels, contributing to each subsampled pixel, may contribute in equal proportions because the signal is significantly oversampled with respect to the chrominance signal bandwidth. Alternatively, contributions from the closer and farther raw pixels may be in a 3 to 1 ratio. Reconstruction of chrominance data at the receiver, for signal subsampled according to FIG. 4, simply requires horizontal interpolation, that is a horizontal upsampling of four to one.

Figure 5:
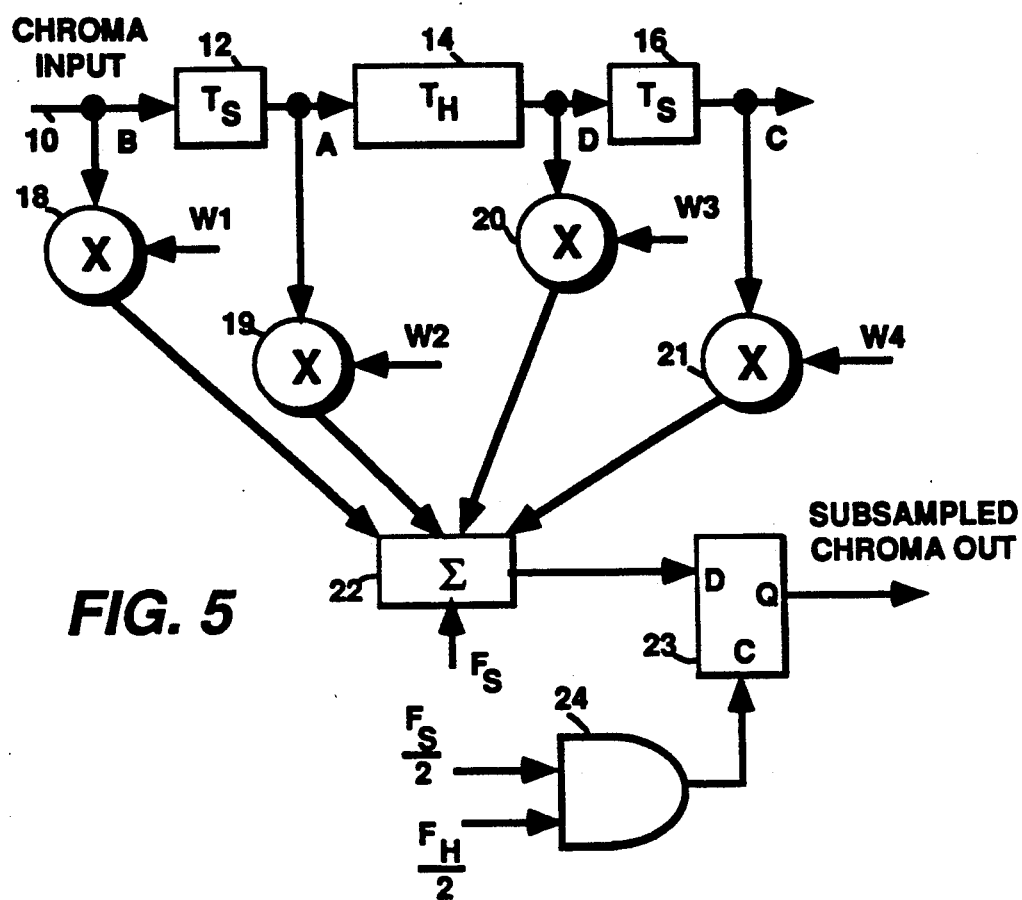
FIGS. 5 and 6 are block diagrams of alternative circuitry for subsampling chrominance according to respective embodiments of the invention.

FIG. 5 illustrates circuitry which may be utilized for the elements 41 and 42 of FIG. 7 to develop subsampled chrominance values. The elements 41 and 42 may be preceded by respective low pass filters to limit the bandwidth of the applied chrominance component signal to satisfy the Nyquist sampling criterion. In FIG. 5, the elements 10-22 develop rows of sample values which are effectively located between each pair of raw samples and between each pair of lines. Elements 23 and 24 select appropriate ones of the generated samples to provide the subsampled signal. Input signal samples occur as mutually exclusive fields of data and at a sample rate fs. The input data is applied to a cascade connection of a one-sample-period delay element 12, a one-line-less-one-sample-period delay element 14, and a further one-sample-period delay element 16. At an instant in time the samples available at the input and output connections of element 16 correspond to pixels D and C (FIG. 3), and simultaneously the samples available at the input and output connections of element 12 correspond to pixels B and A. The input samples are coupled to a weighting element 18 which scales samples applied thereto by a factor W1. Delayed samples available at the output connections of elements 12, 14 and 16 are respectively applied to the weighting elements 19, 20 and 21 which scale samples by the factors W2, W3 and W4 respectively. Scaled samples from the weighting elements 18-21 are summed in an adder 22 which provides successive sums at the input sample rate. Assuming that samples B, A, D and C are applied to the weighting elements 18, 19, 20 and 21 respectively, output samples, SE1i, provided by the adder 22, are of the form;

$$SE1i = W1(B) + W2(A) + W3(D) + W4(C). \quad (4)$$

If the weighting factors W1, W2, W3 and W4 are made equal to $\frac{3}{8}$, $\frac{3}{8}$, $\frac{1}{8}$ and $\frac{1}{8}$ respectively it will be seen that the adder provides sample values commensurate with equation 1. Alternatively, if the weighting factors are all made equal to $\frac{1}{4}$, the resultant values will be effectively spatially located coincident with row 3 (FIG. 3), that is midway between the two lines contributing to the interpolated values.

As indicated, the adder provides samples that occur horizontally between successive raw pixels and vertically between successive rows. The desired signal is one which is subsampled by a factor of two in both the horizontal and vertical directions. Subsampling is accomplished by selecting every other sum on alternate lines of interpolated sums. Selection is accomplished by latching the output of the adder 22 in a data latch 23. The data latch 23 stores and outputs data that is available at its data, D, input immediately prior to the leading transition of a clock signal applied to its clock, C input. The clock signal applied to the data latch 23 is generated by ANDing (24) a squarewave ($F_H/2$) having a frequency of one-half line rate with a squarewave ($F_S/2$) having a frequency of one-half sample rate.

Figure 6:
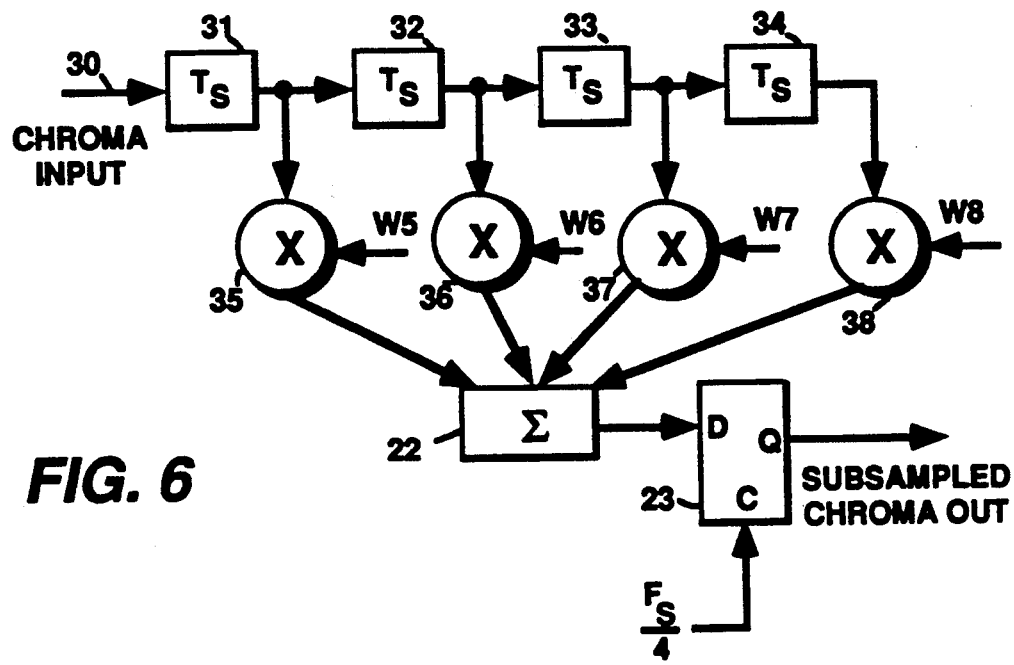

FIG. 6 illustrates an alternative subsampling circuit which performs the method indicated in FIG. 4. The FIG. 4 arrangement develops interpolated values from single lines of raw pixel values. Representative scale factors W5, W6, W7 and W8 which may be applied to elements 35-38, are $\frac{1}{8}$, $\frac{3}{8}$, $\frac{3}{8}$ and $\frac{1}{8}$ respectively. These factors maintain partial horizontal spatial integrity. If this is not a concern than all of the scale factors W5, W6, W7 and W8 may be selected to equal $\frac{1}{4}$.

The import of the invention is not the specifics of the particular interpolation/subsampling process, but rather where in the signal processing chain it is performed. The interpolation/subsampling process for interlace-scan source material, should be performed on a field by field basis and not on a frame basis, prior to video signal compression.

Figure 8:
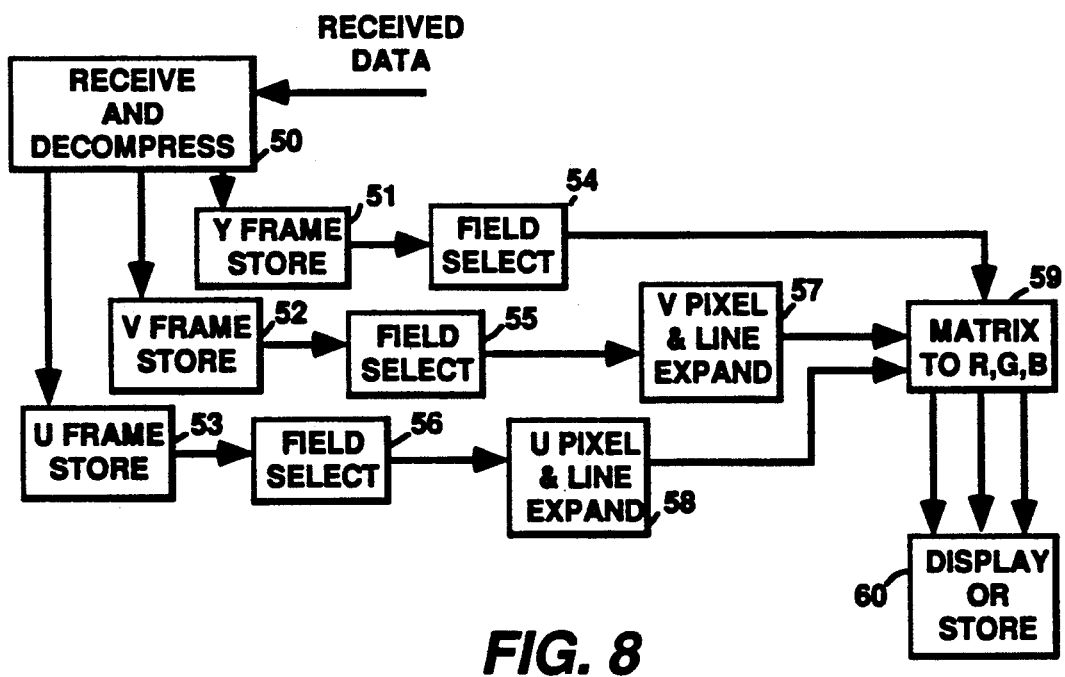
FIG. 8 is a block diagram of a portion of a video signal decompression system according to the invention.

FIG. 8 illustrates a portion of post compression circuitry in receiver apparatus arranged to process signal preprocessed according to the foregoing method. Received data is applied to decompression circuitry 50, wherein the video data is decompressed on a frame basis. Decompressed luminance and chrominance components are stored in frame memories 51, 52 and 53 respectively as part of the decompression process. Respective frames of video data are decomposed (54-56) into corresponding fields (at least figuratively). The respective fields of chrominance data are upconverted (57, 58) on a field by field basis, that is the subsampled chrominance data occurring at a pixel rate N and a line rate M are processed to provide pixels at a 2N rate in lines occurring at a 2M rate. Even (odd) field luminance data is thereafter matrixed (59) with even (odd) field chrominance data to generate R, G and B color video signals.

Figure 9:
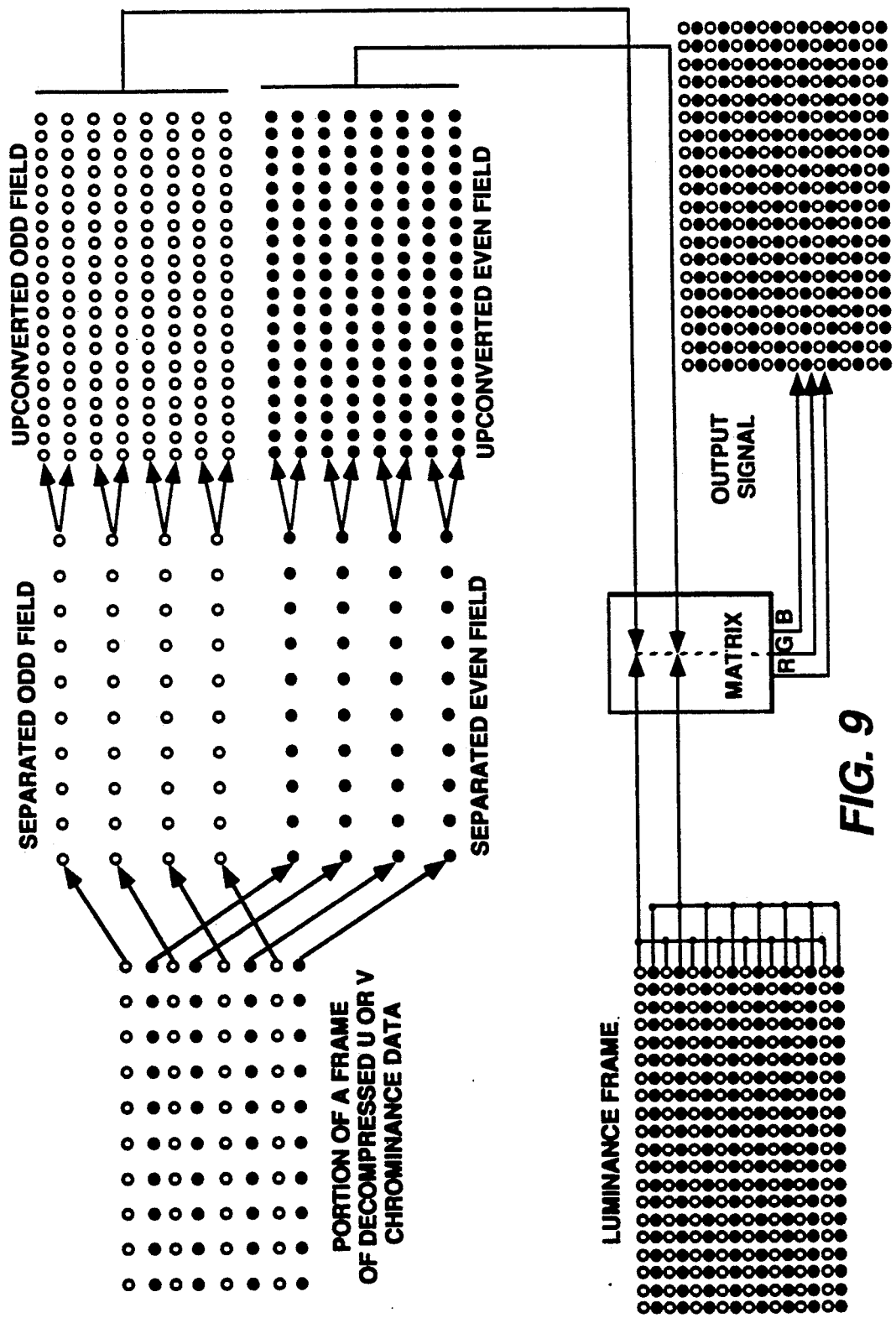
FIG. 9 is a pictorial representation of the processing of video data after decompression.

The post decompression process is shown pictorially in FIG. 9. Moving clockwise from the upper left of the FIGURE, a frame of decompressed, subsampled, chrominance component (U or V) is separated into respective odd and even fields. The odd and even fields of data are upconverted in pixel and line density, to a density equivalent to the density of the raw pixel data from, for example, element 40 of FIG. 7. The upconverted fields of chrominance data are then matrixed with fields of corresponding luminance data to produce output R, G, B video signals. Note that in the matrixing process even (odd) fields of luminance are matrixed with corresponding even (odd) fields of upconverted chrominance.

Figure 10:
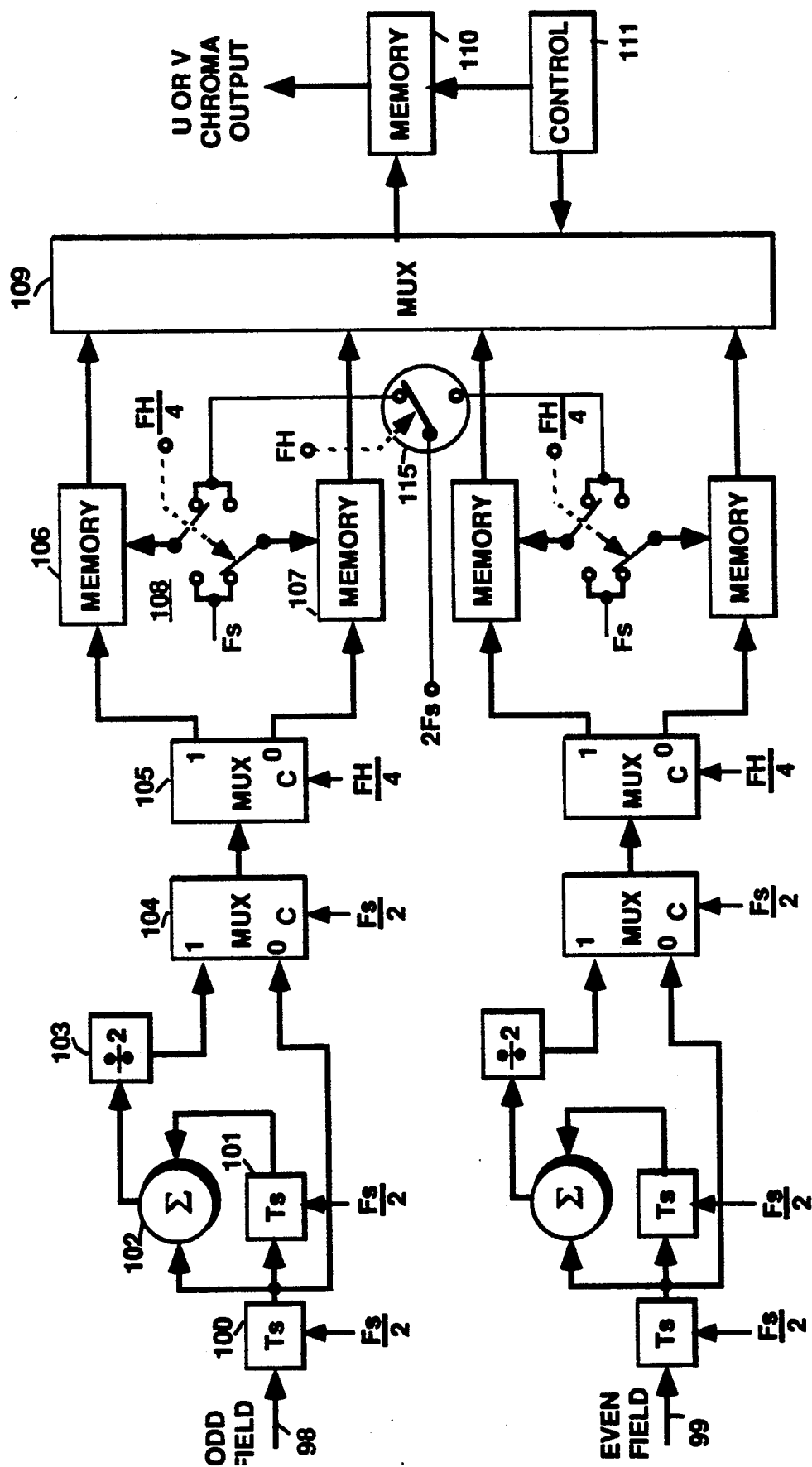
FIG. 10 is a block diagram of exemplary circuitry for expanding chrominance data which has been preprocessed on a field basis prior to compression.

FIG. 10 illustrates exemplary circuitry for upconverting the subsampled chrominance data (assuming subsampling of the form illustrated in FIG. 3). The illustrated apparatus performs a doubling of the number of pixels in horizontal lines and then outputs each upconverted line twice to effect a doubling of the number of lines per field. FIG. 10 includes two channels, one for processing the odd fields and one for processing the even fields. Both fields are available concurrently because the decompressor provides decompressed data on a frame by frame basis. The upconverted data from the two channels are line interleaved in the multiplexer 109, and output to memory 110. Data may thereafter be read from memory 110 in order to perform matrixing on exclusive even and odd field data.

U or V chrominance data from the field select element 56 (55) is applied to the odd and even field input busses 98 and 99 respectively. (Because the even and odd field channels operate similarly, only the odd field channel will be described.) The odd field data is stabilized in a first one-sample-period delay element 100, and coupled to a second one-sample-period delay element 101. Delayed samples from elements 100 and 101 are coupled to respective input terminals of an adder 102 which sums the applied samples. The sums are divided by two to provide the average of the summed samples, which average forms the value of an interstitial pixel spatially located between the two sample values forming the sum. The average value is coupled to one input of a multiplexer 104. The delayed sample from element 100 is coupled to a second input of the multiplexer 104. A squarewave clocking signal having a frequency of the subsampled sample rate is applied to alternately couple the two input terminals of the multiplexer to the output of the multiplexer. The output of the multiplexer 104 consists of a sequence of the decompressed chrominance samples alternating on a sample by sample basis with calculated (interstitial) samples from the divider 103. The sample rate output from the multiplexer 104 is twice the sample rate of the samples applied to the delay element 100.

Samples from the multiplexer 104 are coupled to a further multiplexer 105, which is conditioned to apply alternate lines of samples to memory element 106 and intervening lines of samples to memory element 107. Data is written and read to the elements 106 and 107 at twice the subsampled pixel rate (the original sample rate. Two memory elements are utilized so that data may be read from one memory while new data is written to the other.

Data from the respective memory elements are coupled to a multiplexer 109, which sequentially accesses data from the four memory elements in order to output successive repeated lines of odd field data interleaved with repeated lines of even field data. A representative sequence of data from the multiplexer 109 is of the form $O_0, E_0, O_0, E_0, O_1, E_1, O_1, E_1, O_2, E_2$, etc. where $O_i$ and $E_i$ represent odd and even lines of output data. The subscript i indicates the row of subsampled data from which the row of output data is generated. This is the repeat the line type of vertical upconverting.

Figure 11:
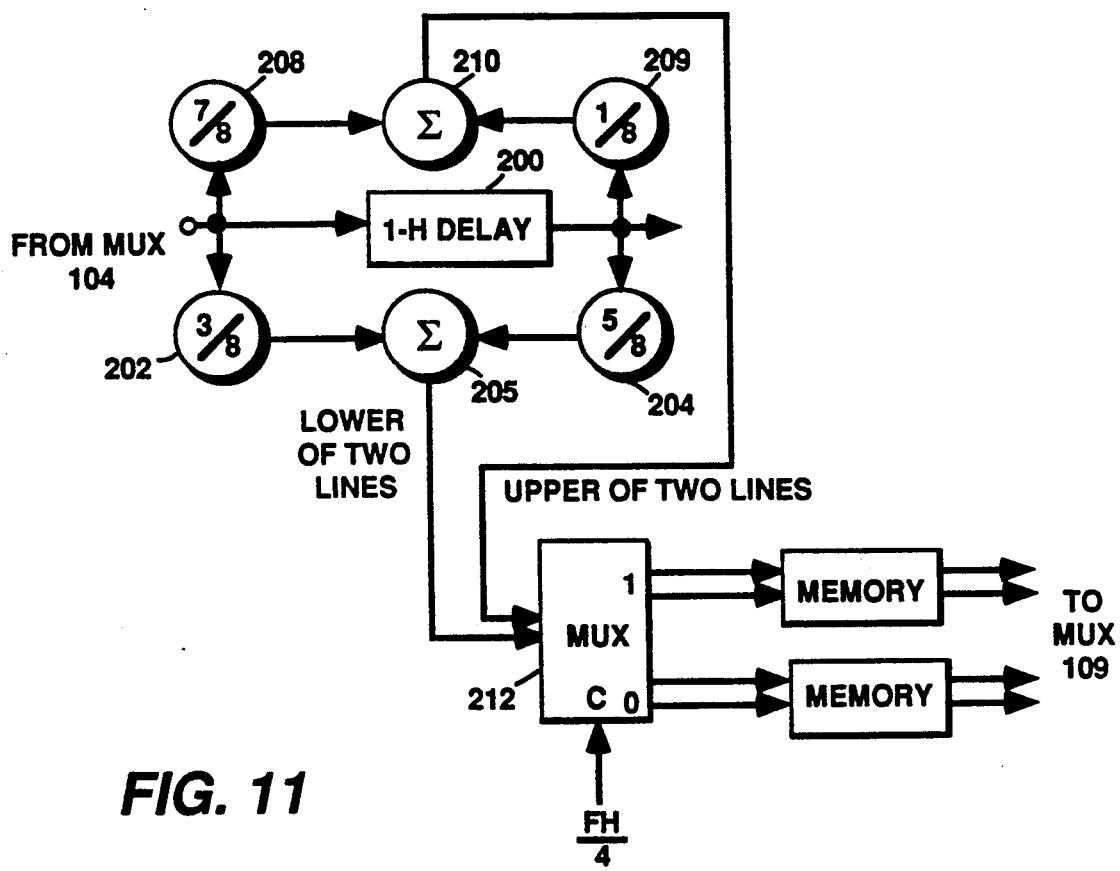
FIG. 11 is a block diagram of exemplary circuitry for upsampling video signal in the vertical dimension.

Consider FIG. 11 which includes an exemplary vertical upconverter to provide vertically interpolated lines of samples according to equations 2 and 3. This circuitry may be substituted for the elements located between the multiplexers 104 and 109 in FIG. 10. One of the FIG. 11 circuits will be substituted in each channel of the FIG. 10 circuit. The FIG. 11 circuitry is arranged to concurrently generate two lines of output data for each line of data output from the multiplexer 104. Consider that horizontally upconverted versions of rows SE1 and SE2 (FIG. 3) have been sequentially output from the multiplexer 104 to the FIG. 11 circuit. The rows of data are applied to the one-horizontal-line delay elements 200, such that vertically aligned data from rows SE2 and SE1 are concurrently available from the input and output connections of delay element 200 respectively. Vertically aligned data from rows SE2 and SE1 are scaled by the factors ⅓ and ⅔ in the weighting elements 202 and 204 respectively. The scaled values from the elements 202 and 204 are summed in the adder 205 to generate chrominance component pixel values representing ROW 6. Vertically aligned data from rows SE2 and SE1 are scaled by the factors ⅓ and ⅔ in the weighting elements 208 and 209 respectively. The scaled values from the elements 208 and 209 are summed in the adder 210 to generate chrominance component pixel values representing ROW 4. The two calculated lines of data are applied to a multiplexer 212, which directs the pairs of lines to one of two memory elements. Data from the respective memory elements is subsequently accessed in an order such as to interleave even and odd field data, or develop separate even fields and odd fields as desired.

What is claimed is:

1. A video signal preprocessor for generating non-interlace-scan video signals from interlace-scan video signals and providing said non-interlace-scan video signals to a frame based compression apparatus, comprising:
 a frame based video signal compression apparatus for compressing component video signals;
 a source of interlace-scan luminance component and chrominance component signals occurring as respective sequences of fields of data;
 means for combining successive fields of luminance component data into corresponding frames of luminance component data, and providing said frames of luminance component data to said compression apparatus;
 means, responsive to fields of chrominance component data, for interpolating, on a mutually exclusive odd or even field basis, the chrominance component data to provide signal samples representing image points different from image points represented by said chrominance component data, and for providing processed chrominance component data which is at least vertically subsampled; and
 means for providing interleaved fields of interpolated/subsampled odd and even fields of chrominance component data to said compression apparatus.

2. A video signal preprocessor for generating non-interlace-scan video signals from interlace-scan video signals and providing said non-interlace-scan video signals to a frame based processor, comprising:
 a source of interlace-scan chrominance component signals occurring as respective sequences of fields of data;
 means, responsive to mutually exclusive odd or even fields of chrominance component data, for interpolating the chrominance component data to provide chrominance component data which is subsampled at least vertically; and
 means for providing interleaved fields of interpolated/subsampled odd and even fields of chrominance component data to said frame based processor.

3. The apparatus set forth in claim 2 wherein said means, responsive to mutually exclusive odd or even fields of chrominance component data, for interpolating the chrominance component data to provide chrominance component data which is subsampled at least vertically includes means for horizontally interpolating said chrominance component data, and subsampling horizontally interpolated chrominance component data to generate one horizontal pixel value for four raw pixel values for each line of said odd fields, and means for horizontally interpolating said chrominance component data, and subsampling horizontally interpolated chrominance component data to generate one horizontal pixel value for four raw pixel values for each line of said even fields, and wherein subsampled even field pixels are interstitial subsampled odd field pixels.

4. The apparatus set forth in claim 2 wherein said means, responsive to mutually exclusive odd or even fields of chrominance component data, for interpolating the chrominance component data to provide chrominance component data which is subsampled at least vertically, further includes means for horizontally interpolating and subsampling said chrominance component data.

5. The apparatus set forth in claim 4 wherein said means for interpolating combines samples from successive field lines in a ratio of three to one, and combines successive horizontal samples in the ratio of one to one.

6. The apparatus set forth in claim 4 wherein said means for interpolating combines samples from successive field lines in a ratio of one to one, and combines successive horizontal samples in the ratio of one to one.

7. Apparatus for post-processing decompressed video signal which has been preprocessed on a field by field basis and compressed and decompressed on a frame basis, comprising:
   a decompresser for providing frames of decompressed video data;
   interpolation means, responsive to decompressed video data corresponding to mutually exclusive fields of said frames of decompressed video data for generating frames of video data having an increased number of horizontal image lines.

8. The apparatus set forth in claim 7 wherein said interpolating means includes means for interpolating video data in both horizontal and vertical dimensions to provide image representative signal of greater effective resolution.

9. The apparatus set forth in claim 7 wherein said interpolating means includes means for combining chrominance data from successive horizontal lines of decompressed data in a ratio of one to eight to generate alternate upconverted lines, and for combining chrominance data from said successive horizontal lines of decompressed data in a ratio of three to five to generate intervening upconverted lines.

10. The apparatus set forth in claim 7 wherein said interpolating means includes means for alternately providing horizontally interpolated pixel data and decompressed pixel data to generate horizontally upconverted pixel data, and means for vertically upconverting said horizontally upconverted pixel data.

11. The apparatus set forth in claim 7 wherein said decompressed video data includes luminance component data and chrominance component data, said chrominance component data is applied to said interpolating means, and said apparatus further includes:
   means for combining odd fields of said frames of video data generated by said interpolating means with corresponding odd fields of said luminance component data, and for combining even fields of said frames of video data generated by said interpolating means with corresponding even fields of said luminance component data.

12. The apparatus set forth in claim 11 wherein said means for combining is a matrixing means for generating red, blue and green color signals.

* * * * *